United States Patent
Willenborg et al.

(10) Patent No.: US 7,855,954 B2
(45) Date of Patent: Dec. 21, 2010

(54) SPECULATIVE CREDIT DATA FLOW CONTROL

(75) Inventors: Scott M. Willenborg, Stewartville, MN (US); Ronald E. Fuhs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 12/176,810

(22) Filed: Jul. 21, 2008

(65) Prior Publication Data

US 2010/0014421 A1    Jan. 21, 2010

(51) Int. Cl.
*H04L 12/26* (2006.01)
(52) U.S. Cl. ........................................ 370/229; 370/235
(58) Field of Classification Search ........................ None
See application file for complete search history.

(56) References Cited

U.S. PATENT DOCUMENTS

| | | | | |
|---|---|---|---|---|
| 4,953,157 A | * | 8/1990 | Franklin et al. | 370/230 |
| 5,210,829 A | * | 5/1993 | Bitner | 710/57 |
| 5,852,602 A | * | 12/1998 | Sugawara | 370/235.1 |
| 6,647,019 B1 | * | 11/2003 | McKeown et al. | 370/422 |
| 2001/0012272 A1 | * | 8/2001 | Aubert et al. | 370/230 |
| 2002/0055993 A1 | * | 5/2002 | Shah et al. | 709/223 |
| 2003/0185155 A1 | * | 10/2003 | Huang et al. | 370/235 |
| 2004/0202155 A1 | * | 10/2004 | Natarajan et al. | 370/360 |
| 2004/0259548 A1 | * | 12/2004 | Moon et al. | 455/436 |
| 2005/0137966 A1 | * | 6/2005 | Munguia et al. | 705/38 |
| 2007/0177498 A1 | | 8/2007 | Clark et al. | |
| 2008/0130941 A1 | * | 6/2008 | Araki | 382/100 |

* cited by examiner

*Primary Examiner*—Kevin C Harper
(74) *Attorney, Agent, or Firm*—Cantor Colburn LLP

(57) ABSTRACT

A method of speculative credit data flow control includes defining a low watermark value as a function of a number of open buffers in a receiving unit; receiving a data packet from a sending unit; determining whether the data packet includes a packet delay indicator; defining a first speculative credit value responsive to receiving the packet delay indicator; defining a second speculative credit value as a function of the first speculative credit value added to a regular credit value; generating a flow control packet including the second speculative credit value; and sending the flow control packet to the sending unit.

15 Claims, 4 Drawing Sheets

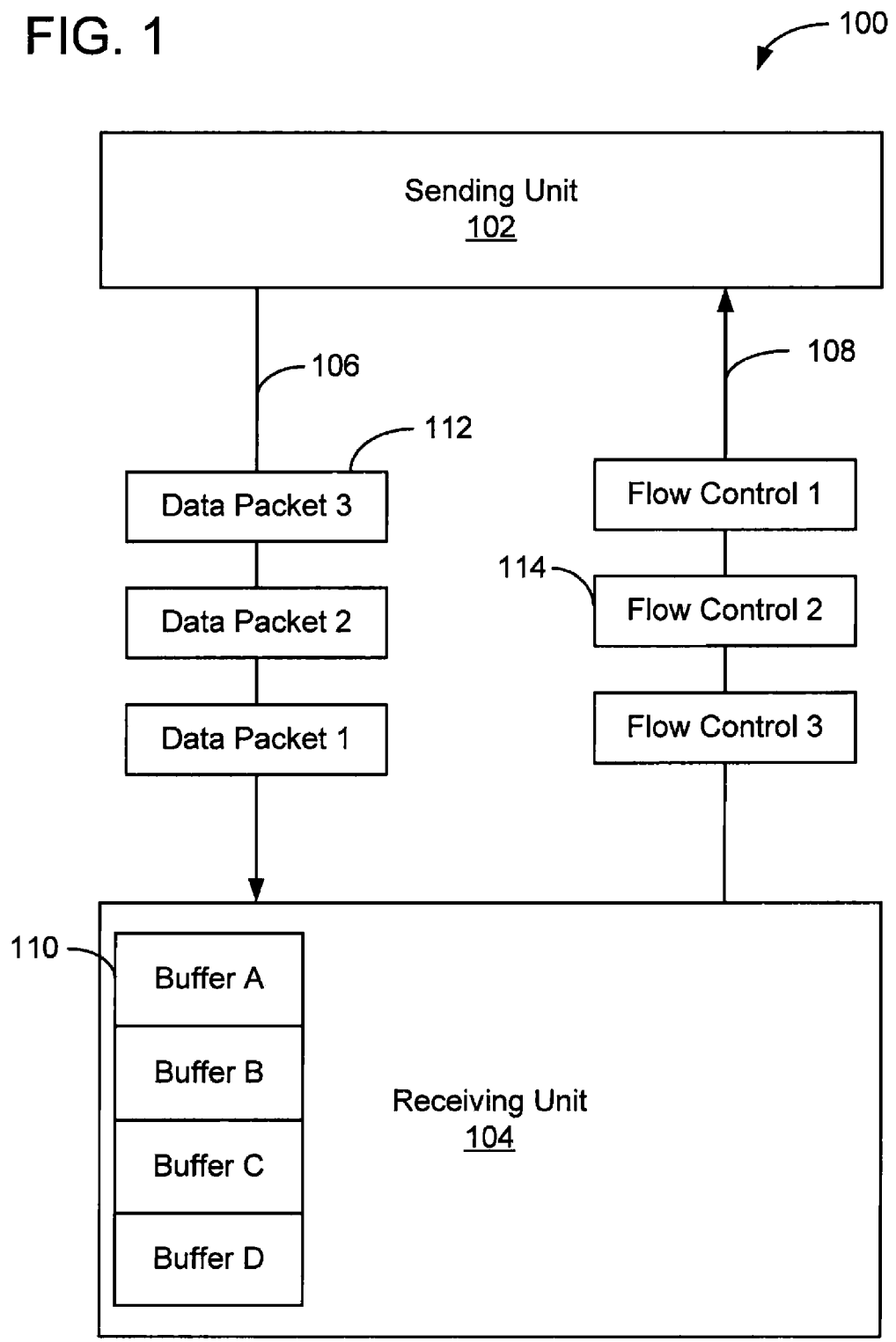

SPECULATIVE CREDIT DATA FLOW CONTROL

BACKGROUND

This disclosure relates generally to the field of data communication, and more specifically to managing data flow in a system.

Data communication systems include senders and receivers. A sender, such as a PCI Express card or a hard drive cache, sends data packets through a communicative link, such as a bus, to a receiver, such as a memory controller. The receiver stores the data packets in buffers until the receiver is ready to process the data packets. If the sender sends data packets to the receiver and the receiver has no available buffers to store the packets, an overflow may occur, slowing the transmission of data.

A previous method to avoid buffer overflows directs the receiver to send flow control messages to the sender before the sender is allowed to send data packets. The flow control messages update the sender with a number of free buffers in the receiver. One drawback to that method is that over non-trivial distances, by the time a sender receives a flow control message, more buffers may have become free. This leads to underutilization of bandwidth and underutilization of buffers.

One technique currently used to address the underutilization of bandwidth is to increase the number of buffers in the receiver. While this technique may decrease the underutilization of bandwidth, this technique may result in an underutilization of buffers.

It is desirable for a method that both increases buffer utilization and bandwidth utilization.

BRIEF SUMMARY

An exemplary embodiment of a method includes defining a low watermark value as a function of a number of open buffers in a receiving unit; receiving a data packet from a sending unit; determining whether the data packet includes a packet delay indicator; defining a first speculative credit value responsive to receiving the packet delay indicator; defining a second speculative credit value as a function of the first speculative credit value added to a regular credit value; generating a flow control packet including the second speculative credit value; and sending the flow control packet to the sending unit.

An exemplary embodiment of a system includes a sending unit, and a receiving unit in communication with the sending unit, wherein the receiving unit is operative to, define a low watermark value as a function of a number of open buffers in a receiving unit, receive a data packet from the sending unit, determine whether the data packet includes a packet delay indicator, define a first speculative credit value responsive to receiving the packet delay indicator, define a second speculative credit value as a function of the first speculative credit value added to a regular credit value, generate a flow control packet including the second speculative credit value, and send the flow control packet to the sending unit.

Additional features and advantages are realized through the techniques of the present exemplary embodiment. Other embodiments and aspects are described in detail herein and are considered a part of what is claimed. For a better understanding of the exemplary embodiment with advantages and features, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 1 illustrates an exemplary embodiment of a data network.

DETAILED DESCRIPTION

Figure 2A:
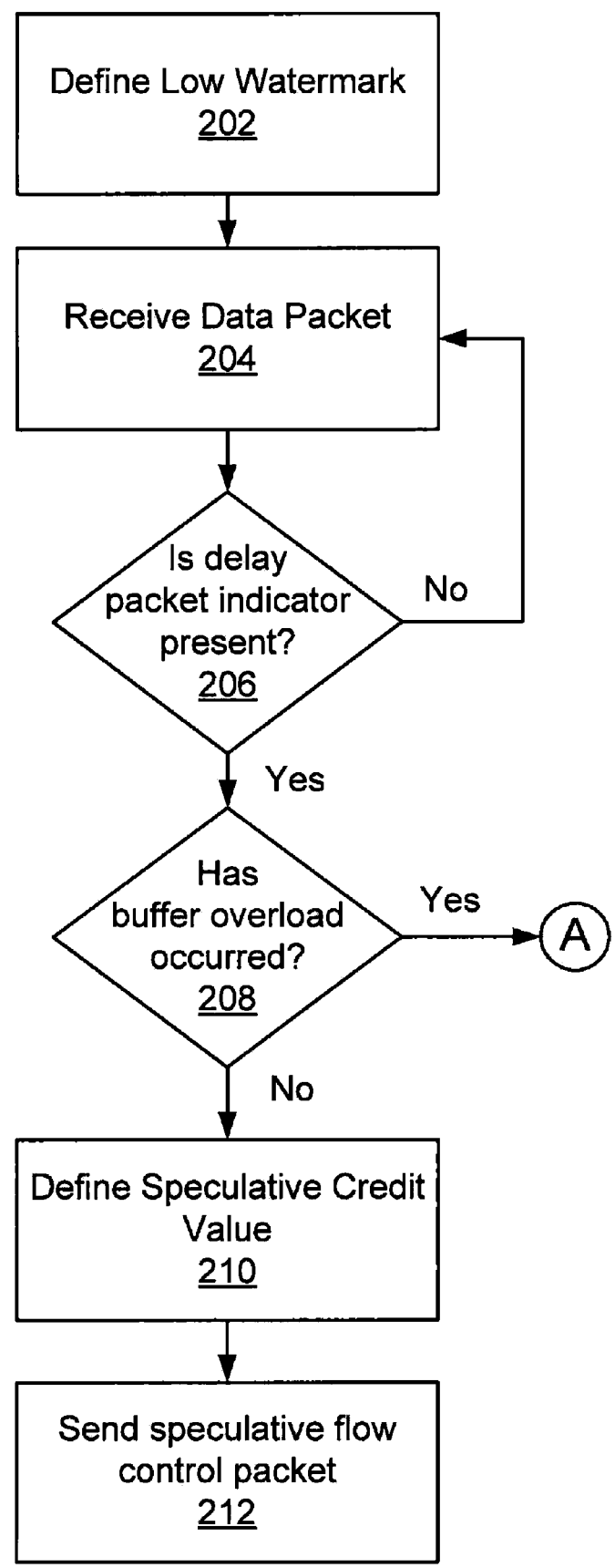
FIGS. 2a, 2b, and 2c illustrate a block diagram of an exemplary embodiment of a method for issuing speculative credits in flow control messages.

An exemplary embodiment provides improved buffer utilization and bandwidth utilization for a network.

Networks often use flow control messages to ensure that the buffers of a receiving unit are not overloaded with data packets from a sending unit. One problem with this method is that in the time in between when the receiving unit sends the flow control message to when the receiving unit starts receiving data packets responsive to the flow control message, more buffers may have become available. If more buffers have become available during the transmission of the flow control message, then buffer resources and bandwidth resources are wasted. One technique used to address the underutilization of bandwidth is to increase the number of buffers in the receiving unit. While this technique may decrease underutilization of bandwidth, this technique may result in an underutilization of buffers. It is desirable for a method and system that allows bandwidth and buffers to be used more efficiently.

In this regard, an exemplary embodiment of a system 100 for issuing speculative credits is illustrated in FIG. 1. System 100 includes a sending unit 102, that may include, for example, a PCI Express card, a hard drive cache, or an internal switch in network communication with receiving unit 104, that may include, for example, a memory controller. The system 100 also includes an interface 107 that may include, for example, a bus, including a send path 108 and a receive path 106.

In operation, the receiving unit 104 is initiated. The receiving unit 104 determines how many buffers 110 are available (open) and sends a flow control message 114 to the sending unit 102 via the interface 108. The flow control message 114 indicates the number of open buffers 110 that are available in the receiving unit 104. The sending unit 102 sends data packets 112 to the receiving unit 104 via the interface 106. The number of data packets 112 sent to the receiving unit 104 is dictated by the flow control message 114 and corresponds to the number of open buffers. Periodically, the receiving unit 104 sends additional flow control messages 114 to the sending unit 102, indicating the number of open buffers 110.

Figure 2B:
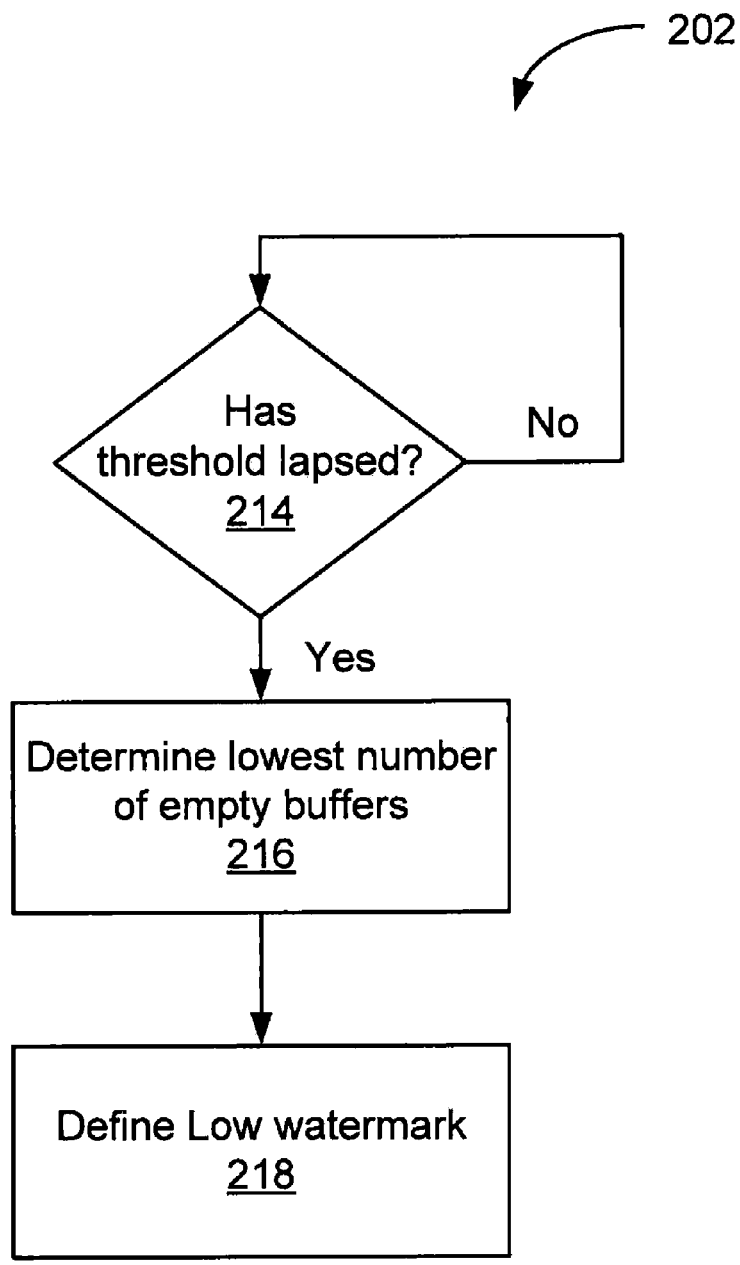

FIGS. 2a & 2b illustrate a block diagram of a method of data flow control. The receiving unit 104 defines a low watermark in block 202. Details of an exemplary method for defining the low watermark are shown in FIG. 2b. In block 214, a threshold value is compared to determine if the threshold has lapsed. The threshold value may, for example, be an amount a time after an initial packet is received. In alternate embodiments, the threshold value may, for example, be a minimum number of packets received. In block 216, once the threshold value has lapsed, the receiving unit 104 determines the lowest number of empty buffers 110 in the receiving unit 104. Based on the lowest number of buffers 110 the receiving unit 104 determines to be empty (over a period of time or after a number of packets are received), the receiving unit 104 defines the low watermark in block 218.

Referring to FIG. 2a, in block 204, the receiving unit 104 receives a data packet. In block 206, the receiving unit 104 determines if a delay packet indicator is present. The delay packet indicator may, for example, be included as a bit in the packet header. The delay packet indicator is set if the sending unit 102 delayed the transmission of the data packet 112 due to an insufficient amount of buffer credits, as indicated by the flow control messages 114 that the sending unit 102 has received. In block 208, if the data packet 112 includes a delay packet indicator, then the receiving unit 104 determines if a buffer overload has occurred. If a buffer overload has occurred, then the receiving unit 104 uses a buffer overload handling function, described below. In block 210, if no buffer overload has occurred, then the receiving unit 104 defines a speculative credit value.

The receiving unit 104 may define a first speculative credit value if two conditions are met: 1) the low watermark is defined to be above a minimum value; and 2) the delay packet indicator is set, indicating that the transmission of the data packet 112 was delayed. If both conditions are met, then the first speculative credit value may be increased. The first speculative credit value may be increased several ways. For example, one embodiment increments the first speculative credit value and reevaluates the first speculative credit value periodically. An alternative exemplary embodiment adds half the difference between the low watermark and the available credit limit. Once the first speculative credit value has been defined, a second speculative credit value is defined as a function of adding the first speculative credit value to a regular credit value. The regular credit value may include, for example, the number of open buffers in the sending unit or alternate embodiments may include the previous second speculative credit value. In block 212, once the second speculative credit value has been defined, the second speculative credit value is used to generate a flow control message 114. The flow control message is sent to the sending unit 102.

Figure 2C:
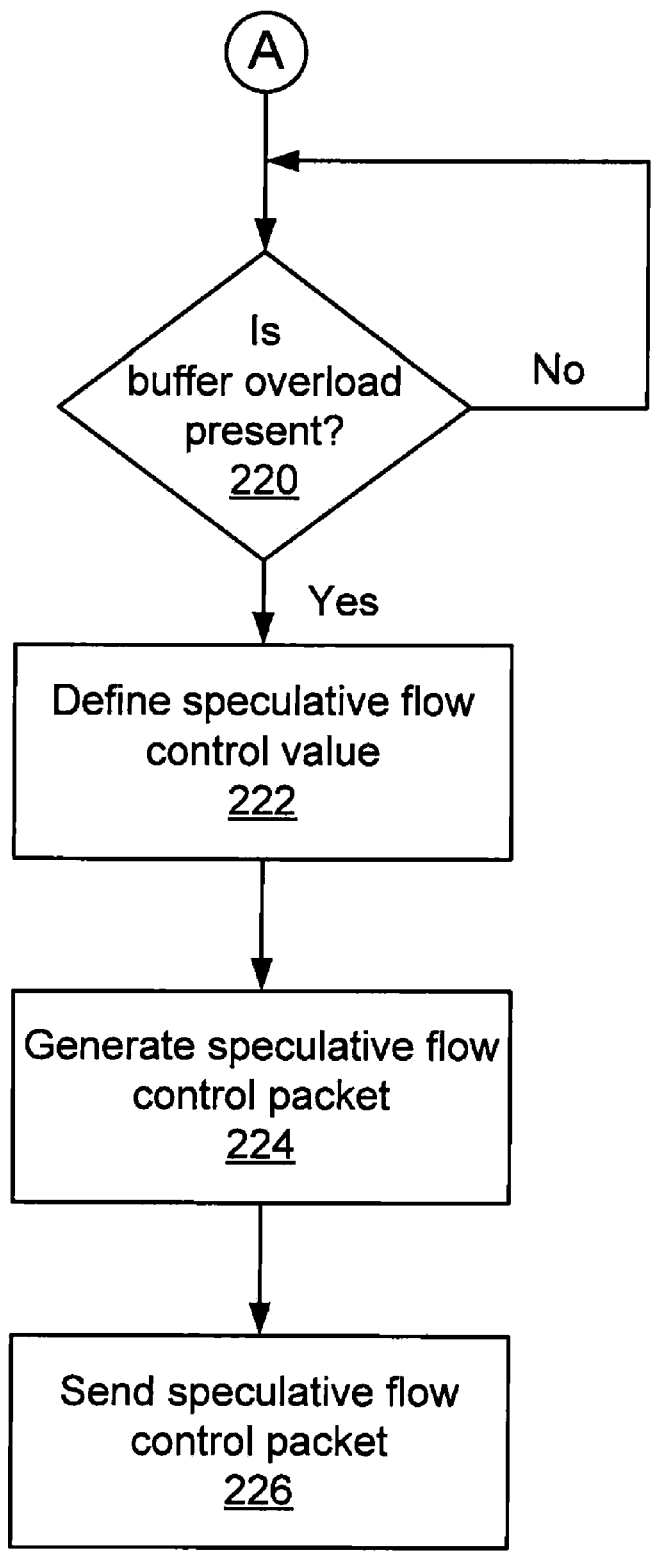

FIG. 2c illustrates a block diagram of an exemplary embodiment of a buffer overload handling function. In block 220, the buffer overload handling function determines if a buffer overload occurred. In block 222, if a buffer overload does occur, then the buffer overload handler defines a speculative credit value; the defined speculative credit value may be lower than the previous speculative credit value. Defining a speculative credit value lower than the previous speculative credit value may be accomplished by defining the speculative credit value several ways. For example, one embodiment may decrement the speculative credit value. An alternate embodiment may set the speculative credit value to zero and start over. An alternate embodiment may set the speculative credit value to the last known successful speculative credit value.

In block 224, after the speculative credit value is defined, a flow control message 114 is generated using the speculative credit value. In block 226, the flow control message 114 is then sent to the sending unit 102.

The system improves buffer utilization and bandwidth utilization by using a receiving unit capable of defining a low watermark and a sending unit capable of setting a packet delay indicator. If the receiving unit determines that the low watermark value is defined to be above a minimum value and the receiving unit receives the packet delay indicator, then the receiving unit defines a speculative credit value and sends the speculative credit value in a flow control message to the sending unit. The flow control message indicates to the sending unit how many open buffers the receiving unit has and the sending unit sends data packets to the receiving unit responsive to receiving the flow control message. The speculative credit value is a "guess" the system makes about how many additional buffers will become available from the time the flow control message is sent until the receiving unit starts receiving data packets responsive to that flow control message. The system may continue to adjust the speculative credit value up as needed. In the event of a buffer overload, the system may lower the speculative credit value.

The technical effects and benefits of exemplary embodiments include improving buffer utilization and bandwidth utilization.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
   defining a low watermark value as a function of a number of open buffers in a receiving unit;
   receiving a data packet from a sending unit;
   determining whether the data packet includes a packet delay indicator located in a header of the data packet, wherein the packet delay indicator is sent by the sending unit responsive to determining that a transmission of the data packet was delayed;
   defining a first speculative credit value responsive to receiving the packet delay indicator, wherein the first speculative credit value is defined by a function comprising adding half a difference between the low watermark value and an available credit limit value to a speculative credit value;
   defining a second speculative credit value as a function of the first speculative credit value added to a regular credit value;
   generating a flow control packet including the second speculative credit value;
   sending the flow control packet to the sending unit; and
   saving the defined second speculative credit value in a register.

2. The method of claim 1, wherein the low watermark value is defined as a lowest number of open buffers responsive to determining that a time threshold has elapsed.

3. The method of claim 1, wherein the low watermark value is defined as a lowest number of open buffers responsive to determining that a threshold amount of data packets have been received.

4. The method of claim 1, wherein the first speculative credit value is defined by a function comprising incrementing a previous second speculative credit value.

5. The method of claim 1, wherein the method further comprises:
   determining if a buffer overload occurred responsive to receiving the data packet;
   decrementing the first speculative credit value responsive to determining that a buffer overload occurred;
   defining the second speculative credit value as a function of the decremented first speculative credit value added to the regular credit value;
   generating a flow control packet including the second speculative credit value; and
   sending the flow control packet to the sending unit.

6. The method of claim 1, wherein the method further comprises:
   determining if a buffer overload occurred responsive to receiving the data packet;
   defining the second speculative credit value as zero responsive to determining that a buffer overload occurred;
   generating a flow control packet including the second speculative credit value; and
   sending the flow control packet to the sending unit.

7. The method of claim 1, wherein the method further comprises:
   determining if a buffer overload occurred responsive to receiving the data packet;
   defining the second speculative credit value as a previous second speculative credit value saved in a register responsive to determining that a buffer overload occurred;
   generating a flow control packet including the second speculative credit value; and
   sending the flow control packet to the sending unit.

8. A system comprising:
   a sending unit; and
   a receiving unit in communication with the sending unit, wherein the receiving unit is operative to, define a low watermark value as a function of a number of open buffers in a receiving unit, receive a data packet from the sending unit, determine whether the data packet includes a packet delay indicator located in a header of the data packet, wherein the packet delay indicator is sent by the sending unit responsive to determining that a transmission of the data packet was delayed, define a first speculative credit value responsive to receiving the packet delay indicator, wherein the first speculative credit value is defined by a function comprising adding half a difference between the low watermark value and an available credit limit value to a speculative credit value, define a second speculative credit value as a function of the first speculative credit value added to a regular credit value, generate a flow control packet including the second speculative credit value, send the flow control packet to the sending unit, and saving the defined second speculative credit value in a register.

9. The system of claim 8, wherein the low watermark value is defined as a lowest number of open buffers responsive to the receiving unit is operative to determine that a time threshold has elapsed.

10. The system of claim 8, wherein the low watermark value is defined as a lowest number of open buffers responsive to the receiving unit is operative to determine that a threshold amount of data packets have been received.

11. The system of claim 8, wherein the first speculative credit value is defined by a function comprising the receiving unit is operative to increment a previous second speculative credit value.

12. The system of claim 8, wherein the receiving unit is further operative to: determine if a buffer overload occurred responsive to receiving the data packet, decrement the first speculative credit value responsive to determining that a buffer overload occurred, define the second speculative credit value as a function of the decremented first speculative credit value added to the regular credit value, generate a flow control packet with the second speculative credit value added to the regular credit value, and send the flow control packet to the sending unit.

13. The system of claim 8, wherein the receiving unit is further operative to: determine if a buffer overload occurred responsive to receiving the data packet, define the second speculative credit value as zero responsive to determining that a buffer overload occurred, generate a flow control packet including the second speculative credit value as zero, and send the flow control packet to the sending unit.

14. The system of claim 8, wherein the receiving unit is further operative to: determine if a buffer overload occurred responsive to receiving the data packet, define the second speculative credit value as a previous second speculative credit value saved in a register responsive to determining that a buffer overload occurred, generate a flow control packet including the second speculative credit value, and send the flow control packet to the sending unit.

15. A method comprising:
   defining a low watermark value as a function of a number of open buffers in a receiving unit;
   receiving a data packet from a sending unit;
   determining whether the data packet includes a packet delay indicator;
   defining a first speculative credit value responsive to receiving the packet delay indicator;
   defining a second speculative credit value as a function of the first speculative credit value added to a regular credit value;
   generating a flow control packet including the second speculative credit value;
   sending the flow control packet to the sending unit;
   determining if a buffer overload occurred responsive to receiving the data packet;
   defining the second speculative credit value as a previous second speculative credit value saved in a register responsive to determining that a buffer overload occurred;
   generating a flow control packet including the second speculative credit value;
   and
   sending the flow control packet to the sending unit.

* * * * *